L. TOPF.
APPARATUS FOR TREATING GRANULAR MATERIAL.
APPLICATION FILED MAY 20, 1913.
1,094,178.
Patented Apr. 21, 1914.
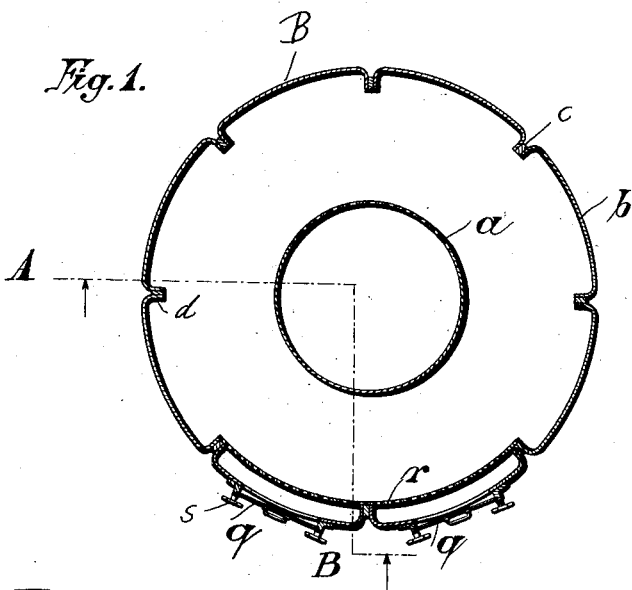
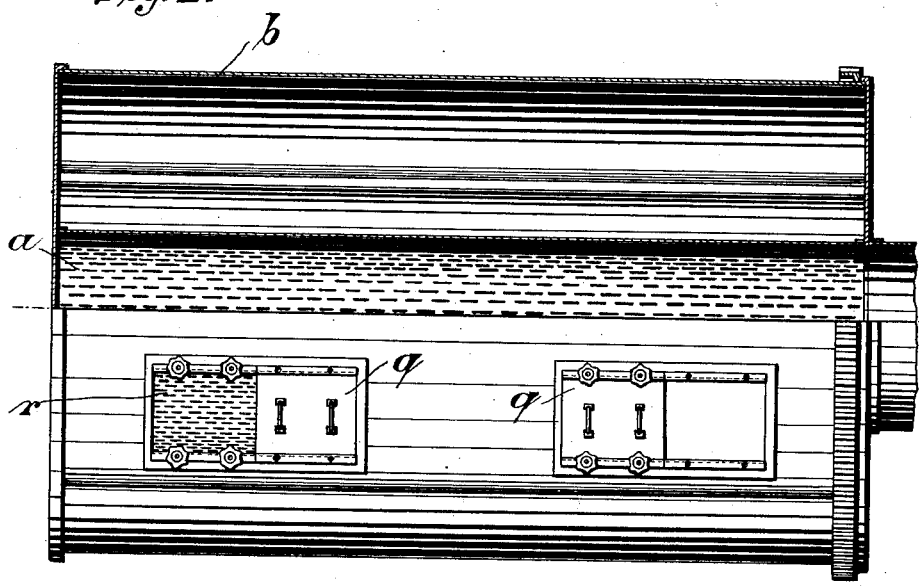
Witnesses:
C. G. McGee.
M. A. Holmes.
Inventor:
Ludwig Topf
By Emil Bönnelycke
Attorney

UNITED STATES PATENT OFFICE.

LUDWIG TOPF, OF ERFURT, GERMANY.

APPARATUS FOR TREATING GRANULAR MATERIAL.

1,094,178. Specification of Letters Patent. Patented Apr. 21, 1914.

Application filed May 20, 1913. Serial No. 768,869.

*To all whom it may concern:*

Be it known that I, LUDWIG TOPF, subject of the German Emperor, residing at Erfurt, Germany, have invented certain new and useful Improvements in Apparatus for Treating Granular Material, of which the following is a specification.

This invention relates to an apparatus for treating granular material, both for cleaning purposes and for preparing the grain, as by steeping, germinating, aerating, drying and in other ways which require the use of a compartment which may be opened and closed for the purpose of cutting off or permitting the ingress of air.

The improvement of the present invention rests in the construction of a drum particularly adapted for treating granular material, the drum being one of the type which is used in the apparatus described in my pending application Ser. No. 689,336, filed April 8, 1912, for drum for the working of any kind of grain.

More particularly, my invention has for its object to provide an improved construction for aerating drums, and has also for its object to provide an improved means in connection with an aerating drum for opening and closing the casing thereof to permit the circulation of air or to hermetically seal the contents of the drum from contact with the atmosphere. That is, it is an object of this invention to construct an aerating drum, in which the casing consists of a plurality of segmental members which form a series of pockets for catching and tossing the grain when the drum is rotated, said segments, as a whole constituting a cylindrical shell capable of concentric rotation around its axis. Further, the object of the invention is to provide a closure for aerating drums which may be inserted in the peripheral portion of the drum without unduly unbalancing the latter by the addition of the extra weight on one side, and which will give the drum a more symmetrical and balanced appearance.

With these objects in view, my invention will be hereinafter fully described, reference being had to the accompanying drawings, in which—

Figure 1 is a transverse section through the drum, and Fig. 2 is a view, partly in section on line A—B of Fig. 1, and partly in elevation.

Referring more particularly to said drawings, *a* indicates a central pipe which carries the drum casing B, and through which air is supplied to the interior of the drum, the pipe being partially perforated. Said pipe *a* is adapted to rotate with the drum casing B, and the processes which are usually carried out in the drum require that the pipe or conduit *a* be perforated throughout a part of its periphery, so that when the drum is at a standstill as shown in Fig. 1 with the air-circulation openings, which are hereinafter described, swung to the lowest part of the drum, the air issuing from the pipe will circulate, through the path of least resistance, first out of the pipe upwardly through the thinnest layer of grain, then downwardly through the grain around said pipe and then out of the drum below the pipe. Or, when the drum is being rotated and the grain is in a state of agitation, the passage of the air through the drum after leaving the central pipe will be as circuitous and complete through the grain as possible.

The drum-casing B is formed of a plurality of segments *b*, which are joined together by being secured to the intermediate strip members *c*. Said segments *b* are formed of sections of sheet metal whose longitudinal edges are turned inwardly, as at *d*, so that the segments are in reality a series of troughs or pockets forming a symmetrical cylinder externally, but internally providing longitudinal peripheral recesses for catching and tossing the grain as the cylinder or drum is rotated, the joints between the several segments being rendered air-tight so that the grain which is being worked in the cylinder can be treated without influence from the external atmosphere.

It is desirable, however, in certain steps of the treatments, as above noted, to circulate air through the grain, or to permit the external atmosphere to have access to the interior of the drum through the drum casing. For accomplishing either of these purposes, the drum is provided with peripheral openings in the following manner: One or more of the segments *b* is suitably cut out to form apertures of any desired conformation, the openings extending longitudinally of the segments, or being in the form of rectangular or circular man-holes. Covers or closures *q* are suitably mounted over said openings and provided with any desired or suitable locking devices *s*, the most necessary requisite of the closures and locking devices being that they hermetically seal the openings. In order to permit the grain in the drum to be worked with the closures to the openings removed, partition screens are necessary. In the improved apparatus of this invention, the openings are covered by the perforated sheet or plates $r$. Said plates $r$ are secured on the inside of the drum, to the inwardly projecting flanges or edges of the segments $b$, and extend over the whole number of segments which are cut out to form the openings. Longitudinally, the plates extend over the whole length of the segments forming the drum, so that a clear air space is formed inside of each pocket-like segment which is provided with the openings and screens or perforated plates, so that the grain may be exposed to the air over the whole length of the drum. By this arrangement, the covers $q$ can be removed from the drum casing, and external air can gain access to the grain contained therein, either when the drum is at a stand-still or is still being revolved, or the grain can be treated with air by circulation from the interior of the drum-pipe $a$ outwardly to the drum casing by the method of circulation hereinbefore described.

It is evident from the above that by the present construction a more symmetrical drum is provided, and one which is more easily rotatable, when loaded with a full quota of grain, by reason of the fact that the closure plates and perforated plates are located nearer to the axis of the drum, so that they exert less leverage which will retard or accelerate the movement when the drum is rotated. Also, the perforated plates $r$ are so located with respect to the inwardly extending edges of the segments $b$ that there is no danger of the grain being packed in the pockets of the segments through which the air can pass by the passage of the air, so that the openings will become clogged.

Having thus described my invention, what I claim and desire to secure by Letters Patent of the United States is:—

1. A drum for working granular material, comprising in combination, a drum casing consisting of a plurality of inwardly flanged segments and having air openings in some of said segments, closures for said air-openings, and perforated plates extending across the flanges of said segments having openings.

2. A drum for working granular material, comprising in combination, a drum casing consisting of a plurality of inwardly flanged segments and having air openings in some of said segments, closures for said air-openings, and perforated plates extending across said flanged segments in spaced relation to said closures.

3. A drum for working granular materials, comprising in combination, a rotary drum casing having a series of inwardly projecting longitudinal flanges, and having air openings between some of said flanges, closures for said air openings and perforated plates extending over said air openings and resting on the adjacent flanges in spaced relation to said closures.

In testimony whereof I affix my signature in presence of two witnesses.

LUDWIG TOPF.

Witnesses:
  ZEDWIG ZÖPPNAR,
  GEORG CHUNDER.

---

Copies of this patent may be obtained for five cents each, by addressing the "Commissioner of Patents, Washington, D. C."